May 9, 1961 M. W. GREEN 2,983,889

SUPERCONDUCTIVE BISTABLE ELEMENTS

Filed July 10, 1959

PRIOR ART

INVENTOR.
MILTON W. GREEN
BY
Milton S. Winters
ATTORNEY

United States Patent Office 2,983,889

Patented May 9, 1961

2,983,889

SUPERCONDUCTIVE BISTABLE ELEMENTS

Milton W. Green, Menlo Park, Calif., assignor to Radio Corporation of America, a corporation of Delaware Filed July 10, 1959, Ser. No. 826,337

9 Claims. (Cl. 338—32)

This invention relates to bistable elements, and particularly to bistable elements of superconducting material.

The two possible directions of circulating current flowing in a loop of superconducting material can be used to represent the two binary digits "1" and "0." Various devices have been suggested in the art for setting the loop circulating current in a desired one of the two directions. An article by M. J. Buckingham, entitled "A Superconducting Memory and Switching Element for Computers," appearing at page 229 of "Low Temperature Physics & Chemistry," published by The University of Wisconsin Press, 1958, describes a "persistent" current element in which the direction of current flow in the element is determined by the polarity of current applied to a conductor connected to the loop. Another article by E. C. Crittenden, Jr., entitled "A Computer Memory Element Employing Superconducting Persistent Currents," and published at page 232 of the above-mentioned text, describes another "persistent" current element using an inductance and a resistance connected to each other in the closed loop. Again the direction of current flow in the element described by Crittenden is determined by the polarity of current applied to a conductor connected to the loop.

It is an object of the present invention to provide improved superconducting elements of the "persistent" current type.

Another object of the present invention is to provide improved superconducting elements of the persistent current type which are simpler to make than the prior elements of similar type.

Still another object of the present invention is to provide superconducting elements of the persistent current type which are not subject to certain disadvantages of the prior art elements of similar type.

According to the present invention, a persistent current element is provided by using two portions of superconducting materials with a first portion having a higher critical magnetic field than the other. The current used to determine the direction of circulating current flow in the element is applied to the first portion of material. The magnetic field generated by the current flow in the first portion causes the other portion, along at least a part of its length, to change to the resistive state. The one portion of material, however, remains in the superconducting state, and then carries all the applied current. After the second portion changes to the resistive state, the applied current is terminated. The resulting circulating current direction is determined solely by the direction of the applied current flow in the first portion at the time the applied current is terminated.

According to one feature of the invention, the two portions may be electrically connected to each other; and, according to another feature, the two portions may be magnetically coupled.

Figure 1:
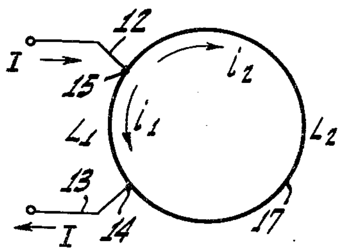
Fig. 1. PRIOR ART
Figs. 1 and 2 are each schematic drawings of a prior art element of the "persistent" current type and useful in explaining the present invention.

The element of Fig. 1 is similar to that described in the Buckingham article referred to above. A pair of input conductors 12 and 13 are connected to two points 14 and 15 of a superconducting ring such that the inductances L1 and L2 of the two branches 16 and 17 are different. Initially, both branches 16 and 17 are in the superconducting state. A selecting current I flowing from the selecting conductor 12 to the selecting conductor 13 divides between the two branches in such a way as to maintain a constant flux through the ring. If the inductance L1 is appreciably less than the inductance L2 most of the selecting current I passes through the smaller branch 16 which eventually changes from the superconducting to the resistive state at a critical current value Ic. After the critical current Ic is reached, any further increase of the selecting current I is diverted through the longer branch 17 which is still in the superconductive state, thereby causing a flux change through the ring 16. However, a portion of the selecting current I continues to flow through the short branch 16 to maintain it in the resistive state. After the desired flux change is established, the selecting current I is terminated. The branch 16 returns to the superconducting state and a circulating current, corresponding to the net flux change, flows in clockwise direction around the ring 16 to maintain that value of net flux. A selecting current of opposite polarity to the current I produces a counterclockwise persistent current circulating in the ring 16 in similar fashion.

Figure 2:
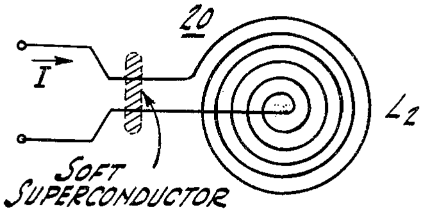

The device 20 of Fig. 2 is described in the above-mentioned Crittenden article. The device 20 is similar to that of Fig. 1 except that the longer branch L2 is arranged in a spiral to increase its inductance and the smaller inductive branch L1 is connected across the end portions of the spiral branch L2. The branch L1 of Fig. 2 is made of a superconductive material which becomes resistive at a relatively low critical current. The spiral branch L2 is made of superconductive material which becomes resistive at a relatively high critical current. The operation of the device of Fig. 2 is apparent from what has been said hereinbefore.

The amount of net circulating current retained in the devices of Figs. 1 and 2 depends upon several relatively complicated considerations such as; (1) whether the short branch is actually driven into a resistive state or merely an intermediate state, oscillating between the resistive and superconductive states, (2) the respective thermal time constants for the two branches, and (3) the rise time, duration, and shape of the selecting current pulse.

The above-mentioned considerations are either of no importance, or secondary importance, in the devices of the present invention. One embodiment of the invention shown in Fig. 3, has a short branch 22 and a long branch 23. The short branch 22 is made from a superconducting material having a relatively high critical current compared to the long branch 23. A high critical current superconductor is known in the art as a "hard" superconductor, and a low critical current superconductor is known in the art as a "soft" superconductor. Suitable superconducting material for the short branch 22 may be, for example, tantalum, niobium, or lead; and suitable superconducting material for the long branch 23 may be tin, zinc, indium, or a lead alloy, such as lead-indium. The loops may be deposited on a suitable substrate such as quartz, silicon monoxide, etc. A pair of selecting conductors 24, 26 are connected at two junction points 28 and 30 between the branches 22 and 23.

In operation, the short branch 22 always remains in the superconductive state due to the fact that its critical current is greater than that of the other longer branch 23. Initially, a selecting current I divides between the two branches 22 and 23 in accordance with the inductances L1 and L2. Again, because the inductance L1 is relatively small compared to the inductance L2, most of the selecting current flows through the short branch 22. As the selecting current increases in amplitude, the magnetic field generated by the selecting current at the junction points 28 and 30 between the two branches 22 and 23 exceeds the critical magnetic field of the long branch 23 causing the branch 23 to change to the resistive state in these two regions. The dotted circles 31 and 32 are used to represent schematically the two regions of the branch 23 particularly affected by the magnetic field generated by the selecting current I flowing in the path 22. In this condition substantially all the selecting current I flows through the shorter branch 22 which remains in the superconducting condition, and substantially no selecting current flows in the longer branch 23. Upon termination of the selecting current, a net persistent current flows in the counter-clockwise sense about the ring. The amount of this circulating current is essentially independent of the time, duration and shape of the applied selecting current. The net circulating current is determined by the critical field value of the branch 23 and the device geometry rather than by the relative division of the selecting current between the two branches as in the prior devices. That is, in the present invention, the higher the critical field for the branch 23, the greater the circulating current for a given geometry. A selecting current opposite from the current I and flowing from the conductor 26 to the conductor 24 causes a clockwise circulating current to flow in the ring in similar fashion. Note that the direction of the circulating current in the present invention for a given polarity selecting current is opposite in direction to that which is obtained in the prior devices.

Figure 3:
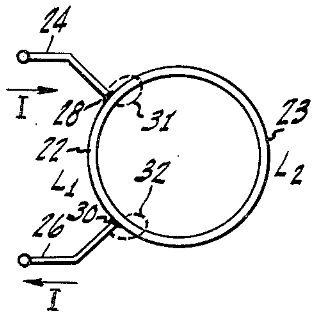
Fig. 3 is a schematic diagram of one form of persistent current element according to the present invention.
Figure 4:
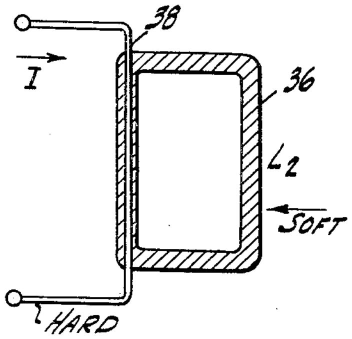
Fig. 4 is a schematic diagram of another form of persistent current element according to the invention having the element portions magnetically coupled.

Observe that the device of Fig. 3 is simpler to construct than a device such as that shown in Fig. 2. The simpler construction results because the short branch L1 of Fig. 3 always remains superconductive during operation, whereas in the prior devices the short branch becomes resistive during operation. Accordingly, in the prior devices, superconductive connections must be provided at each of the junction points between the two branches. In practice, such superconductive connections are difficult to make using conventional evaporating or plating techniques. Thus, the device of Fig. 3 avoids the problem of providing a superconductive connection at the location of the junction points 28 and 30. In fact, the device of Fig. 3 may be made simply by applying the material for the high critical current branch 22 directly over a portion of the relatively low critical current branch 23. For example, as shown in Fig. 4, a device according to the invention may be provided by a closed loop 36 of relatively low critical current superconductive material overlaid by a strip 38 of relatively high critical current superconductive material. If desired, an insulating layer may be placed between the loop 36 and the strip 38. For example, complicated electrical connections may be used in interconnecting an array of such elements in a memory system. In the fabrication of such an array, it may be more convenient to insulate the loops 36 and selecting strips 38 to permit electrical connections of coordinate groupings of the selecting lines 38 without using complicated geometrical arrangements of the strips to avoid short-circuiting problems. A device as shown in the embodiments of Figs. 3 or 4 may be provided in relatively conventional fashion using evaporated metal films, by using photo-engraving techniques, by using foils, and so on.

There has been described herein improved bistable elements of the persistent current type. The described elements are relatively simple to construct and also operate in a manner which avoids certain of the problems associated with prior superconducting elements of similar type.

What is claimed is:

1. In combination a persistent current element comprising a first portion and a second portion, each portion being of superconducting material, said second portion being of a material having a relatively high critical current value, said first portion being of a material having a relatively low critical current value, and means for applying a selecting current to said second portion which thereby generates a magnetic field, said field being coupled to said first portion and changing said first portion to the resistive state while the second portion remains in the superconducting state, the polarity of applied selecting current determining the direction of persistent current flow in said element.

2. The combination as recited in claim 1, said second portion being electrically connected to said first portion.

3. The combination as recited in claim 1, including a closed loop having first and second branches, said first branch being relatively long compared to the length of said second branch, said first and second branches corresponding respectively to said first and second portions.

4. The combination as recited in claim 1, said first portion being connected in a closed loop magnetically coupled by the said field of said second portion.

5. The combination as recited in claim 1, said first portion being of a closed rectangular strip of said material, and said second portion overlying one side of said strip.

6. A persistent current memory device comprising a closed loop of superconducting material, an electrical conductor of superconducting material having a critical current value relatively high compared with said loop material, said conductor overlying a portion of said loop.

7. A persistent current memory device comprising a loop having first and second portions, said first portion being relatively long compared with said second portion, said second portion being of superconducting material having a relatively high critical current value and said first portion having a relatively low critical current value.

8. In combination, a persistent current memory device comprising a loop having first and second portions connected to each other at first and second junctions, said first portion including a relatively long length of superconducting material having a relatively low value of critical current, and said second portion including a relatively short length of superconducting material having a relatively high value of critical current.

9. The combination as recited in claim 8 including selecting means connected to said first and second junctions for selectively producing a current flow of either one or the other polarity in said second portion, said selecting current flow in said second portion causing said first portion to change from an initial superconducting state to the resistive state.

References Cited in the file of this patent

UNITED STATES PATENTS

| | | |
|---|---|---|
| 2,189,122 | Andrews | Feb. 6, 1940 |
| 2,666,884 | Ericsson et al. | Jan. 19, 1954 |
| 2,752,434 | Dunlap | June 26, 1956 |
| 2,752,559 | Lipkin | June 26, 1956 |

Notice of Adverse Decision in Interference

In Interference No. 92,108 involving Patent No. 2,983,889, M. W. Green, SUPERCONDUCTIVE BISTABLE ELEMENTS, final judgment adverse to the patentee was rendered Jan. 3, 1963, as to claims 1, 4 and 6.

[*Official Gazette March 30, 1965.*]